US012586423B2

(12) United States Patent
Kushibiki

(10) Patent No.: US 12,586,423 B2
(45) Date of Patent: Mar. 24, 2026

(54) INFORMATION PROCESSING DEVICE, DRIVING DIAGNOSIS METHOD, AND PROGRAM

(71) Applicant: TOYOTA JIDOSHA KABUSHIKI KAISHA, Aichi-ken (JP)

(72) Inventor: Yukiya Kushibiki, Gifu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 452 days.

(21) Appl. No.: 18/182,395

(22) Filed: Mar. 13, 2023

(65) Prior Publication Data

US 2023/0351817 A1      Nov. 2, 2023

(30) Foreign Application Priority Data

May 2, 2022      (JP) ................................. 2022-076204

(51) Int. Cl.
*G07C 5/02*          (2006.01)
*G06V 20/58*        (2022.01)
(52) U.S. Cl.
CPC ............. *G07C 5/02* (2013.01); *G06V 20/582* (2022.01)
(58) Field of Classification Search
CPC ................................. G07C 5/02; G06V 20/582
See application file for complete search history.

(56) References Cited

U.S. PATENT DOCUMENTS

| | | | |
|---|---|---|---|
| 2016/0117562 A1* | 4/2016 | Chung | G06F 18/22 382/104 |
| 2017/0010117 A1* | 1/2017 | Oh | G01C 21/3602 |
| 2017/0236414 A1* | 8/2017 | Nishimura | B60K 35/29 382/104 |
| 2019/0172227 A1 | 6/2019 | Kasahara | |
| 2022/0063498 A1 | 3/2022 | Matsumura et al. | |

FOREIGN PATENT DOCUMENTS

| | | |
|---|---|---|
| JP | 2022-040533 A | 3/2022 |
| WO | 2018051815 A1 | 3/2018 |
| WO | 2021/002239 A1 | 1/2021 |

* cited by examiner

*Primary Examiner* — Navid Z. Mehdizadeh

(74) *Attorney, Agent, or Firm* — HAUPTMAN HAM, LLP

(57)          ABSTRACT

An information processing device includes: an acquisition unit that acquires travel information related to travel of a vehicle and information of regulation display that has been converted into information from a captured image of the regulation display, the image being captured by a camera mounted on the vehicle; a preprocessing unit that sets data of a missing part to information that has been successfully converted into information before or after the missing part, when conversion into information of the regulation display fails or there is the missing part containing an abnormal value in the information; and a diagnosis unit that executes a driving diagnosis of the vehicle with respect to the regulation display based on the information of the regulation display that has been converted into information and the travel information.

5 Claims, 10 Drawing Sheets

FIG. 11

| POSITION NO. | PRESENCE OR ABSENCE OF SPEED LIMIT SIGN | SPEED LIMIT | RELIABILITY |
|---|---|---|---|
| 1 | ABSENT | | 70 |
| 2 | ABSENT | | 70 |
| 3 | PRESENT | 40 | 70 |
| 4 | PRESENT | 20 | 30 |
| 5 | PRESENT | 50 | 60 |
| 6 | PRESENT | 50 | 60 |
| ⋮ | ⋮ | ⋮ | ⋮ |

FIG. 12

| POSITION NO. | NO-PARKING SIGN FLAG | RELIABILITY |
|---|---|---|
| 1 | 0 | 70 |
| 2 | 0 | 70 |
| 3 | 1 | 70 |
| 4 | 0 | 30 |
| 5 | 1 | 70 |
| 6 | 1 | 70 |
| ⋮ | ⋮ | ⋮ |

INFORMATION PROCESSING DEVICE, DRIVING DIAGNOSIS METHOD, AND PROGRAM

CROSS-REFERENCE TO RELATED APPLICATION

This application claims priority to Japanese Patent Application No. 2022-076204 filed on May 2, 2022, incorporated herein by reference in its entirety.

BACKGROUND

1. Technical Field

The present disclosure relates to an information processing device, a driving diagnosis method, and a program.

2. Description of Related Art

WO 2018/051815 discloses a technique for displaying a surrounding image from an image captured by a wearable terminal on another wearable terminal, and a technique for supplementing defects in the image captured by the wearable terminal.

SUMMARY

When the related art is applied to reading traffic signs with images captured by a traveling vehicle, the image of the wrong sign may be supplemented. Therefore, when the driving diagnosis of the vehicle is performed based on the read traffic sign, there is a risk of erroneous diagnosis.

An object of the present disclosure is to provide an information processing device, a driving diagnosis method, and a program capable of suppressing erroneous driving diagnosis.

An information processing device according to claim 1 includes: an acquisition unit that acquires travel information related to travel of a vehicle and information of regulation display that has been converted into information from a captured image of the regulation display, the image being captured by a camera mounted on the vehicle; a preprocessing unit that sets data of a missing part to information that has been successfully converted into information before or after the missing part, when conversion into information of the regulation display fails or there is the missing part containing an abnormal value in the information; and a diagnosis unit that executes a driving diagnosis of the vehicle with respect to the regulation display based on the information of the regulation display that has been converted into information and the travel information.

In the information processing device according to claim 1, the acquisition unit acquires travel information related to travel of a vehicle and information of regulation display that has been converted into information from a captured image of the regulation display. The image is captured by a camera mounted on the vehicle. Here, the regulation display is, for example, a display related to a speed limit or a display related to a prohibited act. When conversion into information of the regulation display fails or there is a missing part containing an abnormal value in the information, the preprocessing unit sets data of the missing part to information that has been successfully converted into information before or after the missing part. Here, failure to convert the regulation display into information means, for example, that the reliability of the information of the regulation display that has been converted into information from the captured image of the regulation display is less than a threshold value. The diagnosis unit executes a driving diagnosis of the vehicle with respect to the regulation display based on the information of the regulation display that has been converted into information and the travel information.

When conversion into information of the regulation display fails or there is a missing part containing an abnormal value in the information, the information processing device sets data of the missing part to information that has been successfully converted into information before or after the missing part. Therefore, according to the information processing device, erroneous driving diagnosis can be suppressed.

In the information processing device according to claim 2, based on the information processing device according to claim 1, when there is the missing part and a result of the driving diagnosis performed based on the information that has been successfully converted into information before or after the missing part is good, the preprocessing unit sets the data of the missing part to the information of the regulation display with the good result.

In the information processing device according to claim 2, when there is the missing part and a result of the driving diagnosis performed based on the information that has been successfully converted into information before or after the missing part is good, the data of the missing part is set to the information of the regulation display with the good result. According to the information processing device, the data of the missing part is set to the information of the regulation display when the result of the driving diagnosis performed based on the information that has been successfully converted into information before or after the missing part is good. Therefore, erroneous driving diagnosis can be further suppressed.

In the information processing device according to claim 3, based on the information processing device according to claim 1, when there is the missing part, the preprocessing unit sets the data of the missing part to a maximum value of the information that has been successfully converted into information before or after the missing part.

In the information processing device according to claim 3, when there is the missing part, the preprocessing unit sets the data of the missing part to a maximum value of the information that has been successfully converted into information before or after the missing part. According to the information processing device, the data of the missing part is set to the maximum value of the information that has been successfully converted into information before or after the missing part. Therefore, erroneous driving diagnosis can be further suppressed.

In a driving diagnosis method according to claim 4, a computer executes processes including: acquiring travel information related to travel of a vehicle and information of regulation display that has been converted into information from a captured image of the regulation display, the image being captured by a camera mounted on the vehicle; setting data of a missing part to information that has been successfully converted into information before or after the missing part, when conversion into information of the regulation display fails or there is the missing part containing an abnormal value in the information; and executing a driving diagnosis of the vehicle with respect to the regulation display based on the information of the regulation display that has been converted into information and the travel information.

In the driving diagnosis method according to claim 4, the computer acquires travel information related to travel of a vehicle and information of regulation display that has been converted into information from a captured image of the regulation display. The image is captured by a camera mounted on the vehicle. When conversion into information of the regulation display fails or there is a missing part containing an abnormal value in the information, the computer sets data of the missing part to information that has been successfully converted into information before or after the missing part. The computer executes a driving diagnosis of the vehicle with respect to the regulation display based on the information of the regulation display that has been converted into information and the travel information.

When conversion into information of the regulation display fails or there is a missing part containing an abnormal value in the information, in the driving diagnosis method, data of the missing part is set to information that has been successfully converted into information before or after the missing part. Therefore, according to the driving diagnosis method, erroneous driving diagnosis can be suppressed.

A program according to claim 5 is a program that causes a computer to execute processes including: acquiring travel information related to travel of a vehicle and information of regulation display that has been converted into information from a captured image of the regulation display, the image being captured by a camera mounted on the vehicle; setting data of a missing part to information that has been successfully converted into information before or after the missing part, when conversion into information of the regulation display fails or there is the missing part containing an abnormal value in the information; and executing a driving diagnosis of the vehicle with respect to the regulation display based on the information of the regulation display that has been converted into information and the travel information.

In the program according to claim 5, the computer acquires travel information related to travel of a vehicle and information of regulation display that has been converted into information from a captured image of the regulation display. The image is captured by a camera mounted on the vehicle. When conversion into information of the regulation display fails or there is a missing part containing an abnormal value in the information, the computer sets data of the missing part to information that has been successfully converted into information before or after the missing part. The computer executes a driving diagnosis of the vehicle with respect to the regulation display based on the information of the regulation display that has been converted into information and the travel information.

When conversion into information of the regulation display fails or there is a missing part containing an abnormal value in the information, in the program, data of the missing part is set to information that has been successfully converted into information before or after the missing part. Therefore, according to the program, erroneous driving diagnosis can be suppressed.

According to the present disclosure, erroneous driving diagnosis can be suppressed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 11 is a diagram showing an example of a plurality of types of information of regulation display when the information of the regulation display is a speed limit sign; and FIG. 12 is a diagram showing an example of a plurality of types of the information of the regulation display when the information of the regulation display is a no-parking sign.

DETAILED DESCRIPTION OF EMBODIMENTS

Figure 1:
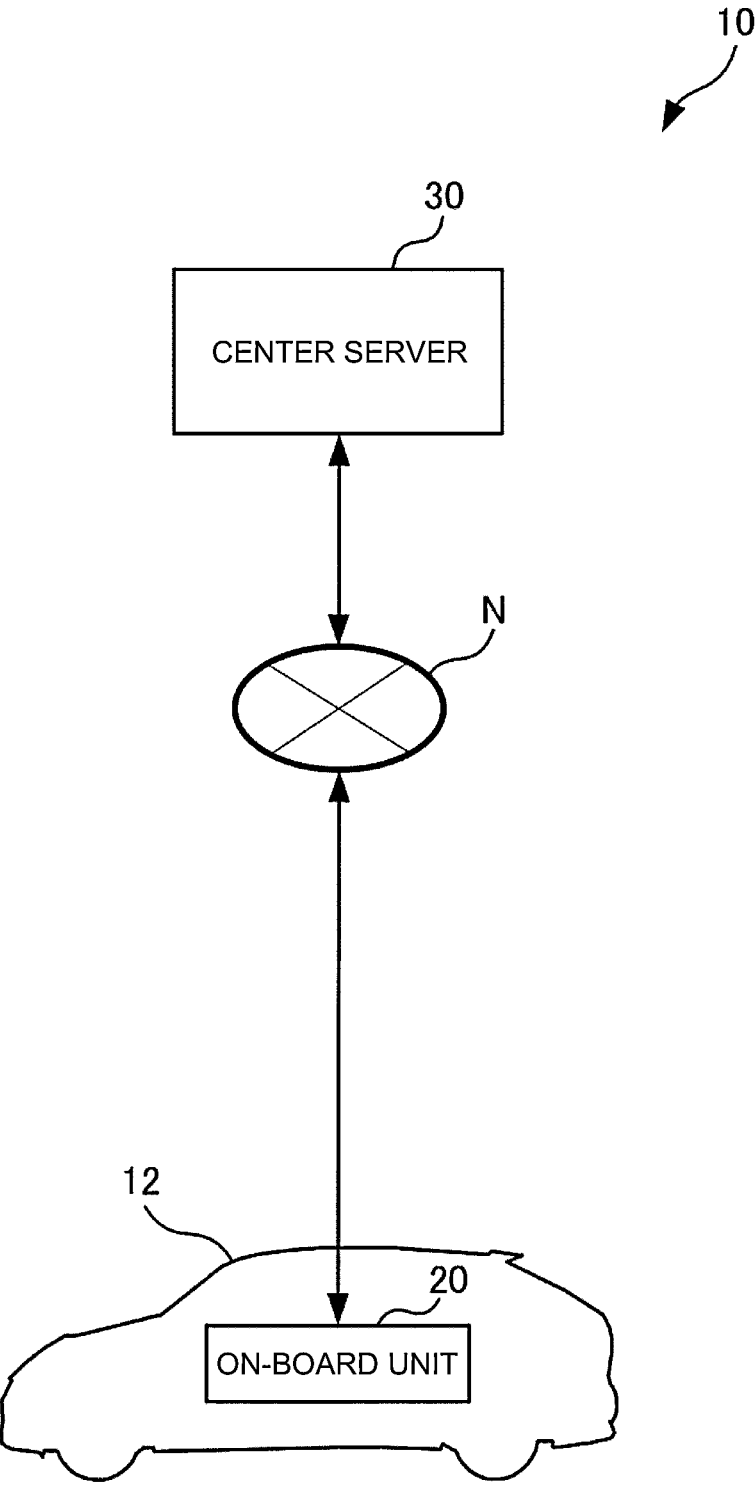
FIG. 1 is a diagram showing a schematic configuration of a driving diagnosis system according to the present embodiment.

A driving diagnosis system including an information processing device of the present disclosure will be described. The driving diagnosis system is a system that performs driving diagnosis using information of traffic signs collected in a vehicle and travel information of the vehicle.
Overall Configuration As shown in FIG. 1, a driving diagnosis system 10 according to the present embodiment includes a vehicle 12 and a center server 30 serving as an information processing device. The vehicle 12 is equipped with an on-board unit 20. The on-board unit 20 and the center server 30 are connected to each other through a network N. Although FIG. 1 shows one vehicle 12 and one on-board unit 20 with respect to one center server 30, the numbers of the vehicles 12 and the on-board units 20 are not limited to one.

Figure 2:
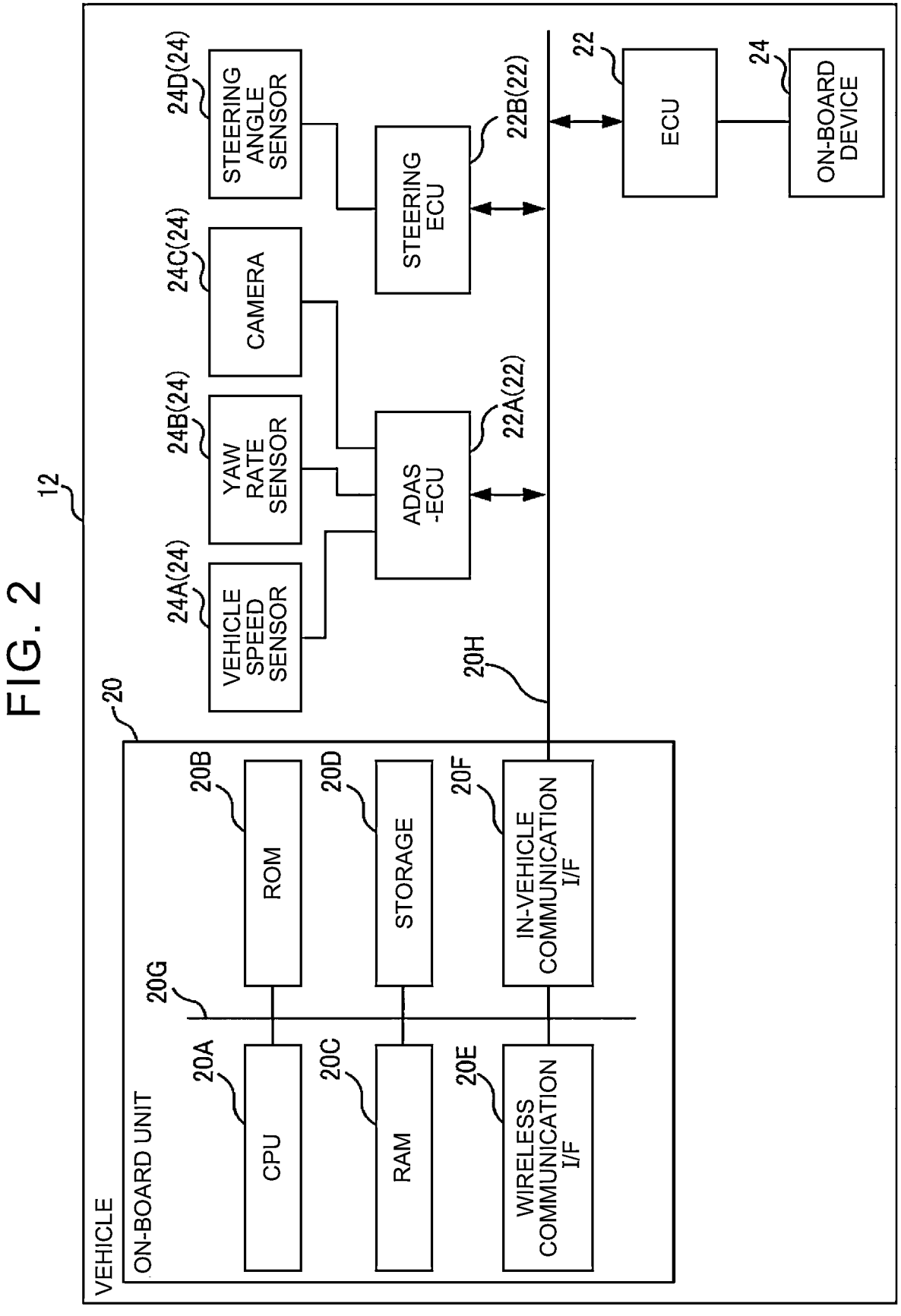
FIG. 2 is a block diagram showing a hardware configuration of a vehicle according to the present embodiment.

The center server 30 is installed in, for example, a manufacturer that manufactures the vehicle 12, a car dealer, or any business operator.
Vehicle As shown in FIG. 2, the vehicle 12 according to the present embodiment includes the on-board unit 20, a plurality of electronic control units (ECUs) 22, and a plurality of on-board devices 24.

The on-board unit 20 includes a central processing unit (CPU) 20A, a read-only memory (ROM) 20B, a random access memory (RAM) 20C, a storage 20D, a wireless communication interface (I/F) 20E, and an in-vehicle communication I/F 20F. The CPU 20A, the ROM 20B, the RAM 20C, the storage 20D, the wireless communication I/F 20E, and the in-vehicle communication I/F 20F are connected so as to be able to communicate with each other via an internal bus 20G.

The CPU 20A is a central processing unit that executes various programs and controls various units. That is, the CPU 20A reads a program from the ROM 20B or the storage 20D and executes the program using the RAM 20C as a work area.

Figure 3:
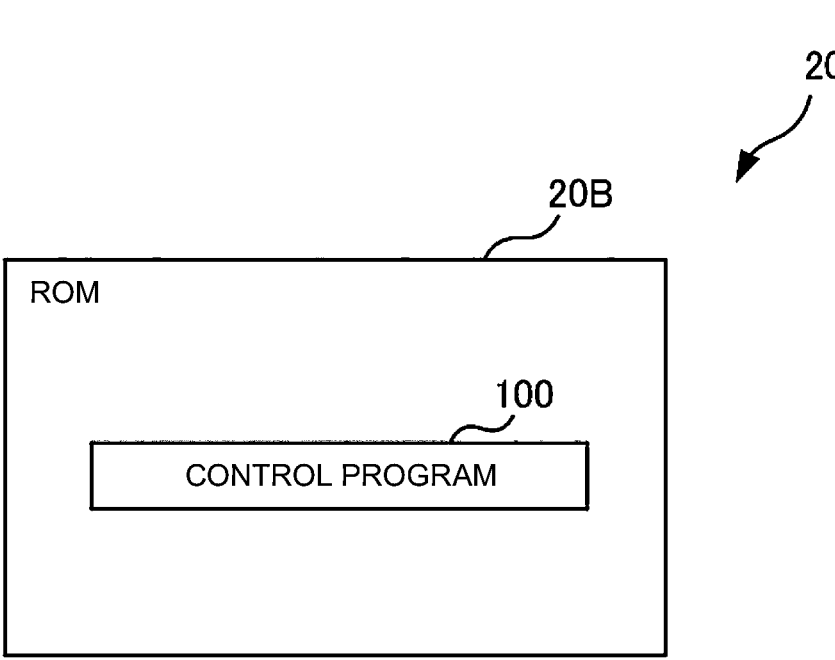
FIG. 3 is a block diagram showing a configuration of a read-only memory (ROM) of an on-board unit according to the present embodiment.

The ROM 20B stores various programs and various data. As shown in FIG. 3, a control program 100 is stored in the ROM 20B of the present embodiment. The control program 100 is a program for transmitting, to the center server 30, information of regulation display that has been converted into information from an image captured by a camera.

As shown in FIG. 2, the RAM 20C temporarily stores a program or data as a work area.

Figure 4:
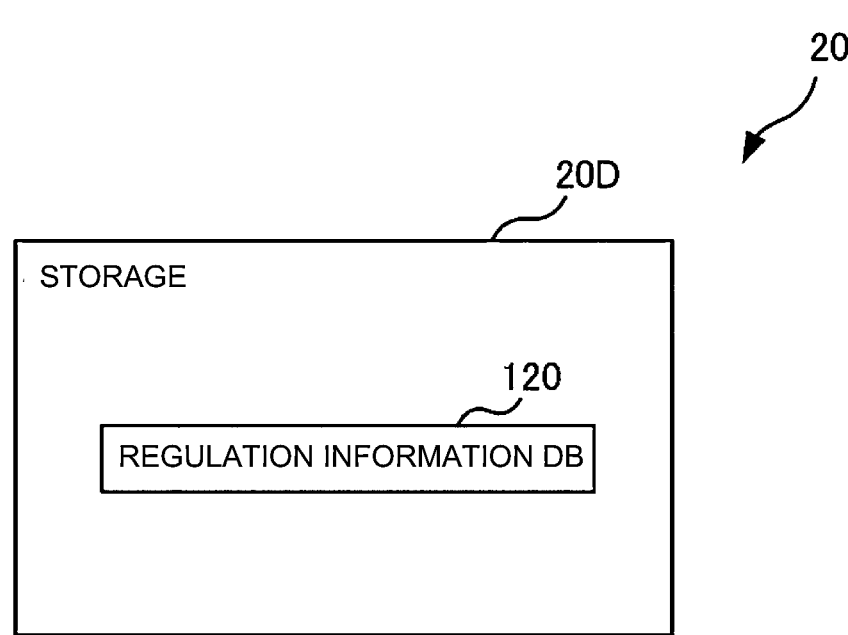
FIG. 4 is a block diagram showing a configuration of a storage of the on-board unit according to the present embodiment.

The storage 20D that is a memory is composed of a hard disk drive (HDD) or a solid state drive (SSD), and stores various programs and various data. As shown in FIG. 4, the storage 20D of the present embodiment stores a regulation information database (DB) 120, which is a data group of the information of the regulation display that has been converted into information. Note that the storage 20D may store the control program 100 and the regulation information DB 120.

As shown in FIG. 2, the wireless communication I/F 20E is a wireless communication module for communicating with the center server 30. For the wireless communication module, for example, communication standards such as fifth generation (5G), long term evolution (LTE), and Wi-Fi (registered trademark) are used. The wireless communication I/F 20E is connected to the network N.

The in-vehicle communication I/F 20F is an interface for connecting to each of the ECUs 22. For the interface, a communication standard based on a controller area network (CAN) protocol is used. The in-vehicle communication I/F 20F is connected to an external bus 20H.

The ECUs 22 include at least an advanced driver assistance system (ADAS)-ECU 22A, a steering ECU 22B, a brake ECU 22C, and an engine ECU 22D.

The ADAS-ECU 22A controls an advanced driver assistance system in an integrated manner. A vehicle speed sensor 24A, a yaw rate sensor 24B, and a camera 24C that constitute the on-board devices 24 are connected to the ADAS-ECU 22A. The camera 24C is a camera that captures images of the surroundings of the vehicle 12.

The steering ECU 22B controls power steering. A steering angle sensor 24D constituting the on-board devices 24 is connected to the steering ECU 22B. The steering angle sensor 24D is a sensor that detects the steering angle of the steering wheel.

Figure 5:
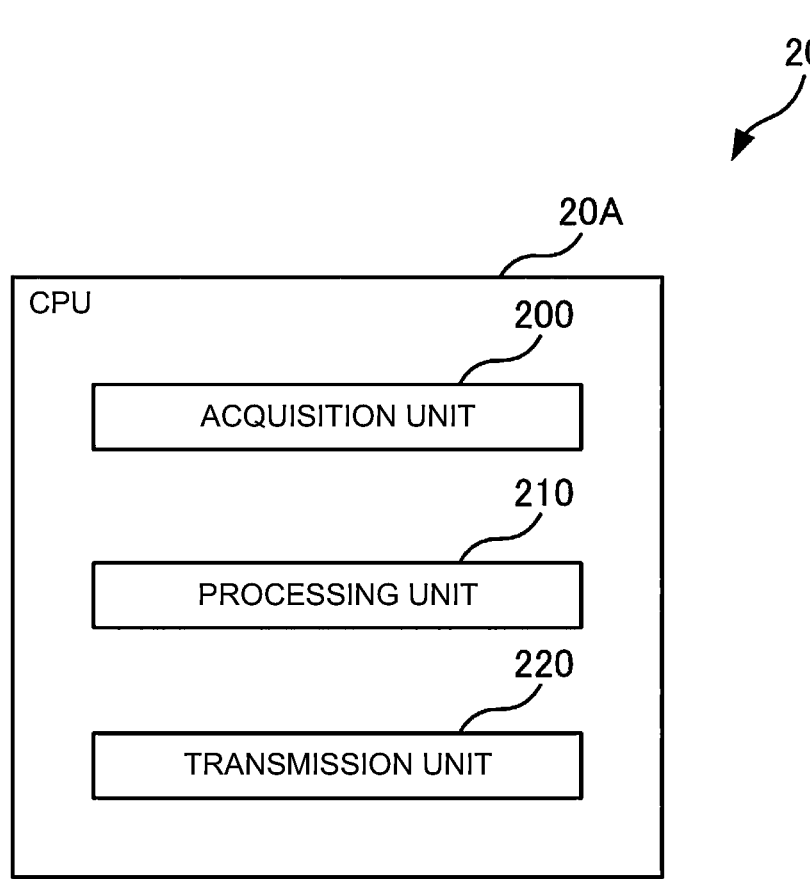
FIG. 5 is a block diagram showing a functional configuration of the on-board unit according to the present embodiment.

As shown in FIG. 5, in the on-board unit 20 of the present embodiment, the CPU 20A functions as an acquisition unit 200, a processing unit 210, and a transmission unit 220 by executing the control program 100.

The acquisition unit 200 has a function of acquiring vehicle information. The vehicle information is information such as the state of the on-board devices 24, the state of the vehicle 12 obtained from the on-board devices 24, and the captured images captured in the vehicle 12. The vehicle information of the present embodiment includes travel information such as position information, vehicle speed, yaw rate, or steering angle. The vehicle information also includes captured images of the outside of the vehicle 12 captured by the camera 24C.

The processing unit 210 causes the storage 20D to store the vehicle information acquired by the acquisition unit 200, and recognizes the regulation display from the captured images captured by the camera 24C, thereby converting the images into information of the regulation display. Specifically, the processing unit 210 of the present embodiment causes the storage 20D to temporarily store the vehicle information, and then transmits the vehicle information to the center server 30 via the transmission unit 220 when requested from the center server 30. The processing unit 210 also converts the captured images captured by the camera 24C into information by image recognition processing to obtain the information of the regulation display, and derives the reliability of the information of the regulation display.

More specifically, the processing unit 210 recognizes a speed limit sign or a prohibition sign (a stop sign, a no-parking sign, or a no-turning sign), which is a regulation display represented by the captured image, and converts the image into information representing a flag that indicates the presence or absence of a speed limit or a prohibition sign.

The transmission unit 220 has a function of transmitting the vehicle information and the information of the regulation display stored in the storage 20D to the center server 30. Specifically, the transmission unit 220 of the present embodiment transmits the vehicle information and the information of the regulation display stored in the storage 20D to the center server 30 when requested by the center server 30.

Center Server

Figure 6:
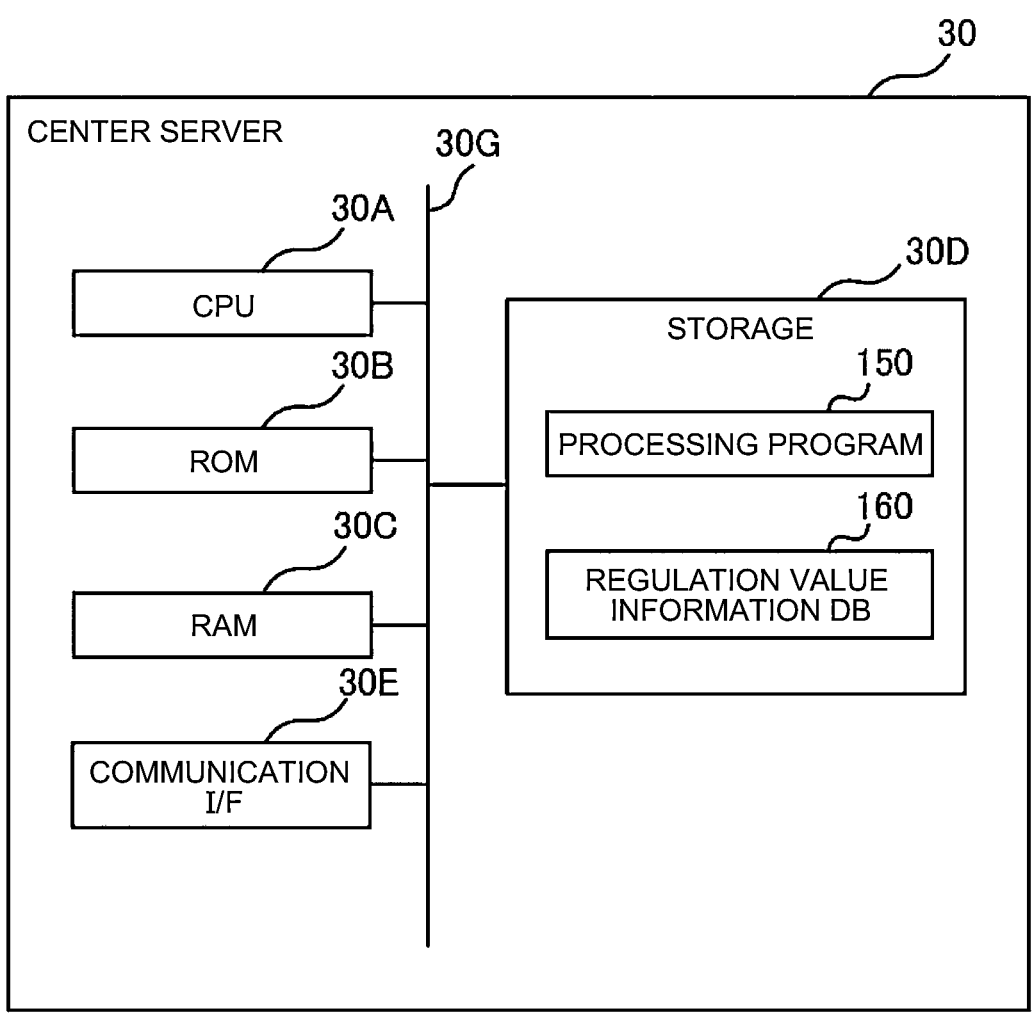
FIG. 6 is a block diagram showing a hardware configuration of a center server according to the present embodiment.

As shown in FIG. 6, the center server 30 includes a CPU 30A, a ROM 30B, a RAM 30C, a storage 30D, and a communication I/F 30E. The CPU 30A, the ROM 30B, the RAM 30C, the storage 30D, and the communication I/F 30E are connected so as to be able to communicate with each other via an internal bus 30G. The functions of the CPU 30A, the ROM 30B, the RAM 30C, the storage 30D, and the communication I/F 30E are the same as those of the CPU 20A, the ROM 20B, the RAM 20C, the storage 20D, and the wireless communication I/F 20E of the on-board unit 20 described above. The communication I/F 30E may perform wired communication. The CPU 30A is an example of a processor.

A processing program 150 as a program and a regulation value information DB 160 are stored in the storage 30D of the present embodiment. Note that the ROM 30B may store the processing program 150 and the regulation value information DB 160.

The processing program 150 is a program for controlling the center server 30. With the execution of the processing program 150, the center server 30 collects the information of the regulation display from the vehicle 12 and executes various processes for performing the driving diagnosis on the travel information of the vehicle 12.

The regulation value information DB 160 stores the information of the regulation display and the reliability collected from the vehicle 12.

Specifically, flags indicating the presence or absence of a speed limit, a stop sign, a no-parking sign, or a no-turning sign, which are converted into information at each position, are stored together with the reliability.

Figure 7:
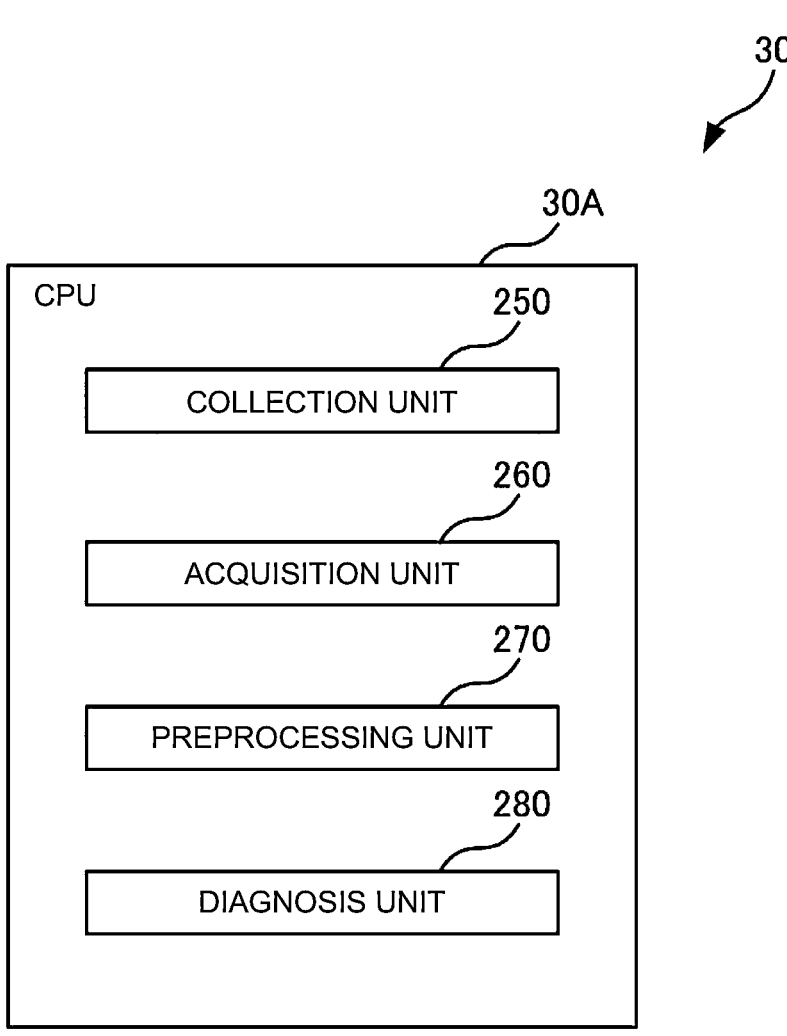
FIG. 7 is a block diagram showing a functional configuration of the center server according to the present embodiment.

As shown in FIG. 7, in the center server 30 of the present embodiment, the CPU 30A functions as a collection unit 250, an acquisition unit 260, a preprocessing unit 270, and a diagnosis unit 280 by executing the processing program 150.

The collection unit 250 has a function of acquiring the information of the regulation display from the on-board unit 20 of the vehicle 12. The collection unit 250 causes the regulation value information DB 160 to store the acquired information of the regulation display together with the reliability and the position information indicating the position that has been converted into information.

The acquisition unit 260 has a function of acquiring the vehicle information of the vehicle 12 from the on-board unit 20 of the vehicle 12.

If the conversion into information of the regulation display fails or if there is a missing part containing an abnormal value in the information, the preprocessing unit 270 sets the data of the missing part to information that has been successfully converted into information before or after the missing part.

Specifically, when there is a missing part, the preprocessing unit 270 sets the data of the missing part to the maximum value of the information that has been successfully converted into information before or after the missing part.

More specifically, when the reliability of a sign related to the speed limit is equal to or greater than a threshold value (for example, 50%), the speed limit that has been converted into information is recorded.

When the reliability of the sign related to the speed limit is less than the threshold value (for example, 50%), it is determined that the data is a missing part where the conversion into information of the regulation display has failed, and the speed limit of the missing part is set to the maximum value of the speed limit successfully converted into information before or after the missing part.

Further, when the difference from the speed limit successfully converted into information before or after the missing part is equal to or greater than a threshold value (for example, 40 km/h), it is determined that the data is a missing part with the information containing an abnormal value, and the speed limit of the missing part is set to the maximum value of the speed limit successfully converted into information before or after the missing part.

In the case where the regulation display that has been converted into information is a display related to a prohibited act (a stop sign, a no-parking sign, or a no-turning sign), when the reliability of the flag indicating the presence of absence of the display related to the prohibited act that has been converted into information is equal to or greater than a threshold value (for example, 50%), the preprocessing unit 270 records the flag indicating the presence or absence of the display related to the prohibited act.

When the reliability of the flag indicating the presence or absence of the display related to the prohibited act is less than the threshold value (for example, 50%), it is determined that the data is a missing part in which the conversion into information of the regulation display has failed, and the flag of the missing part is set to the maximum value (0 or 1) of the flag successfully converted into information before or after the missing part. Here, when the flag is 1, it means that there is a display related to a prohibited act.

The diagnosis unit 280 diagnoses a violation when travel of the vehicle based on the travel information included in the vehicle information acquired from the on-board unit 20 of the vehicle 12 satisfies a violation condition based on the updated regulation value.

Specifically, the diagnosis unit 280 diagnoses whether the driving of the vehicle 12 is considered a violation on the violation condition that the vehicle 12 is traveling significantly exceeding the speed limit in the vicinity of the sign related to the speed limit.

For example, "vehicle speed>speed limit+overspeed" is set as the violation condition. The overspeed is 20 km/h, 30 km/h, or 40 km/h.

Further, the diagnosis unit 280 diagnoses whether the driving of the vehicle 12 is considered a violation on a violation condition that the vehicle 12 does not stop in the vicinity of the stop sign.

For example, in the case where the flag related to the stop sign is ON, when it is provisionally diagnosed as a violation but the vehicle speed becomes less than a threshold value (for example, 1 km/h), the provisional diagnosis of the violation is deleted, and it is diagnosed that no violation has been made.

Further, the diagnosis unit 280 diagnoses whether the driving of the vehicle 12 is considered a violation on the violation condition that the vehicle 12 is parked in the vicinity of the no-parking sign.

For example, when the flag related to the no-parking sign is ON and the vehicle speed is less than a threshold value (for example, 1 km/h), it is provisionally diagnosed as a violation, but when the duration of the state in which the vehicle speed is less than the threshold value (1 km/h) is less than a threshold value (for example, 180 seconds), the provisional diagnosis of violation is deleted and it is diagnosed that no violation has been made.

Further, the diagnosis unit 280 diagnoses whether the driving of the vehicle 12 is considered a violation on the violation condition that the vehicle 12 makes a turn in the vicinity of the no-turning sign.

For example, when the flag related to the no-turning sign is ON, it is provisionally diagnosed as a violation, but when the maximum yaw angle of the vehicle 12 is less than a threshold value (for example, 150°) and the maximum steering angle of the steering wheel of the vehicle 12 is less than a threshold value (for example, 400°), the provisional diagnosis of violation is deleted and it is diagnosed that no violation has been made.

Flow of Control

The flow of processes executed by the driving diagnosis system 10 of the present embodiment will be described with reference to the flowcharts of FIG. 8 to FIG. 10. The processes in the on-board unit 20 are executed by the CPU 20A of the on-board unit 20 functioning as the acquisition unit 200, the processing unit 210, and the transmission unit 220. The processes in the center server 30 are executed by the CPU 30A of the center server 30 functioning as the collection unit 250, the acquisition unit 260, the preprocessing unit 270, and the diagnosis unit 280.

Figure 8:
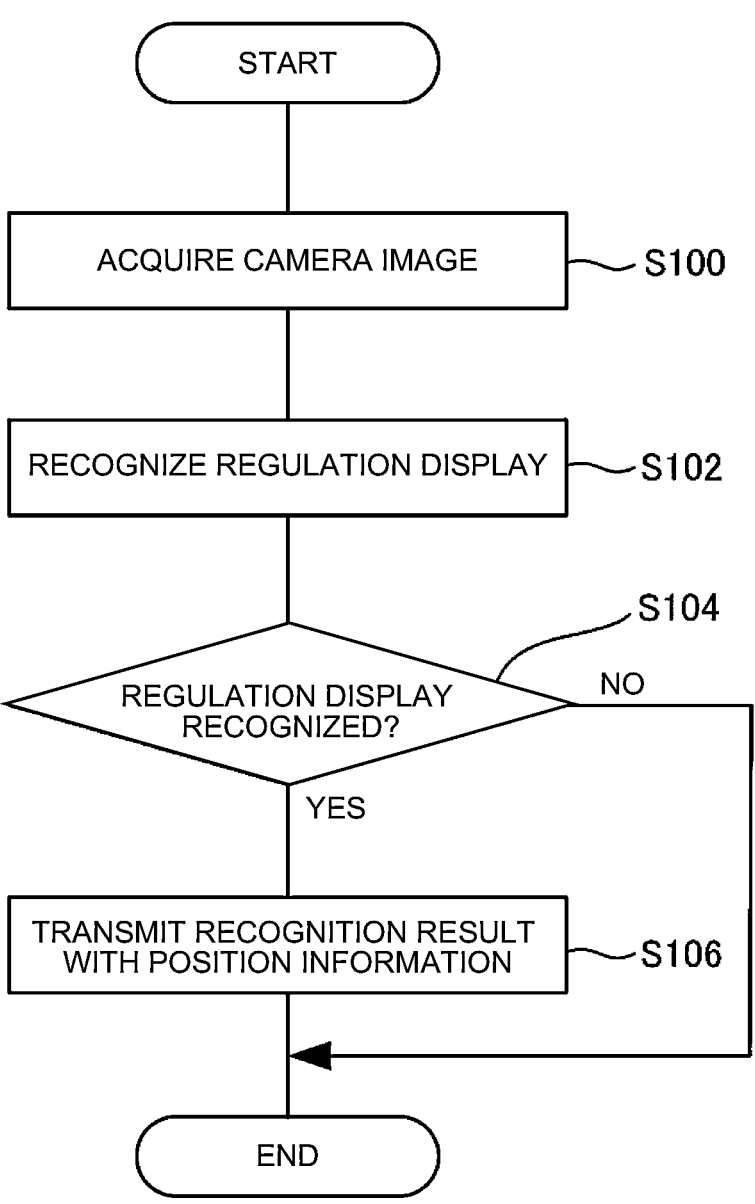
FIG. 8 is a flowchart showing a flow of a regulation display information transmission process executed in the on-board unit according to the present embodiment.

First, while the vehicle 12 is traveling, the CPU 20A of the on-board unit 20 executes the regulation display information transmission process shown in FIG. 8.

In step S100 of FIG. 8, the processing unit 210 acquires the captured image of the outside of the vehicle 12, which is captured by the camera 24C.

In step S102, the processing unit 210 recognizes the regulation display from the captured image captured by the camera 24C, converts the image into information of the regulation display, derives the reliability of the information of the regulation display, and causes the regulation information DB 120 to temporarily store the information.

In step S104, the processing unit 210 determines whether the regulation display has been recognized by the process in step S102. When the regulation display is recognized by the process in step S102, the process proceeds to step S106. On the other hand, when the regulation display is not recognized by the process in step S102, the regulation display information transmission process is terminated.

In step S106, the transmission unit 220 transmits the information of the regulation display obtained as the recognition result in step S102 to the center server 30 together with the reliability of the information of the regulation display and the position information, and ends the regulation display information transmission process.

The center server 30 causes the regulation value information DB 160 to store the information of the regulation display received from the on-board unit 20 together with the reliability and the position information of the position that has been converted into information.

While the vehicle 12 is traveling, the on-board unit 20 transmits the acquired vehicle information to the center server 30. At this time, in the center server 30, the CPU 30A repeatedly executes the driving diagnosis process shown in FIG. 9.

Figure 9:
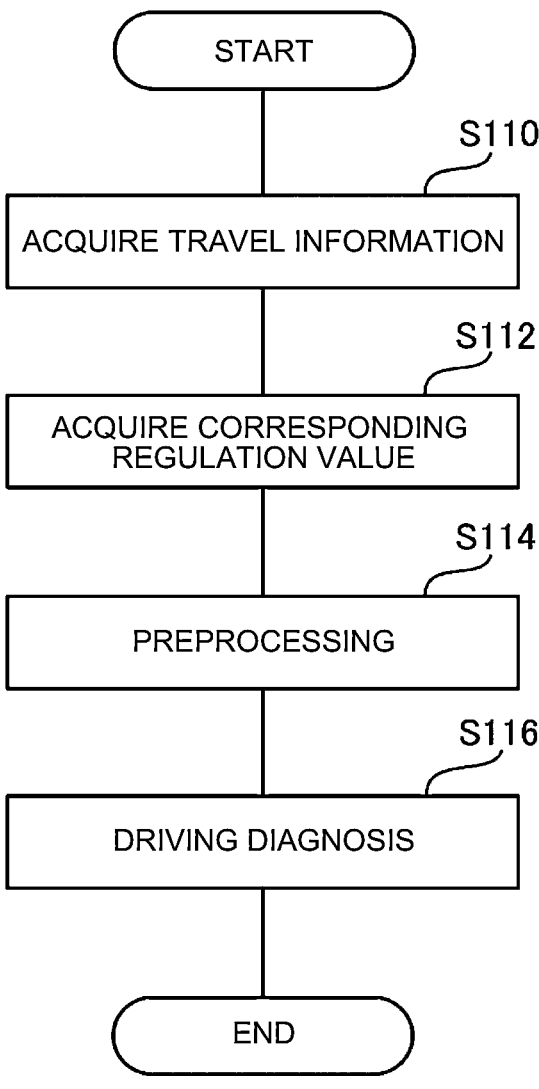
FIG. 9 is a flowchart showing a flow of a driving diagnosis process executed in the center server according to the present embodiment.

In step S110 of FIG. 9, the acquisition unit 260 acquires the vehicle information of the vehicle 12 from the on-board unit 20 of the vehicle 12.

In step S112, the preprocessing unit 270 acquires, from the regulation value information DB 160, the information of the regulation display corresponding to the position information included in the acquired vehicle information and the reliability of the information of the regulation display. Here, it is assumed that a plurality of types of the information of the regulation display corresponding to the position information included in the acquired vehicle information is acquired.

Specifically, when the regulation display is a speed limit sign, the preprocessing unit 270 acquires, from the regulation value information DB 160, the speed limit, which is the regulation value corresponding to the position information included in the acquired vehicle information, and the reliability of the sign related to the speed limit.

When the regulation display is a stop sign, the preprocessing unit 270 acquires, from the regulation value information DB 160, the flag related to the stop sign, which is the regulation value corresponding to the position information included in the acquired vehicle information, and the reliability of the stop sign.

When the regulation display is a no-turning sign, the preprocessing unit 270 acquires, from the regulation value information DB 160, the flag related to the no-turning sign, which is the regulation value corresponding to the position information included in the acquired vehicle information, and the reliability of the no-turning sign.

When the regulation display is a no-parking sign, the preprocessing unit 270 acquires, from the regulation value information DB 160, the flag related to the no-parking sign, which is the regulation value corresponding to the position information included in the acquired vehicle information, and the reliability of the no-parking sign.

In step S114, when the information of the regulation display acquired in step S112 fails to be converted into information of the regulation display, or when there is a missing part containing an abnormal value, the preprocessing unit 270 sets the data of the missing part to information that has been successfully converted into information before or after the missing part.

Figure 10:
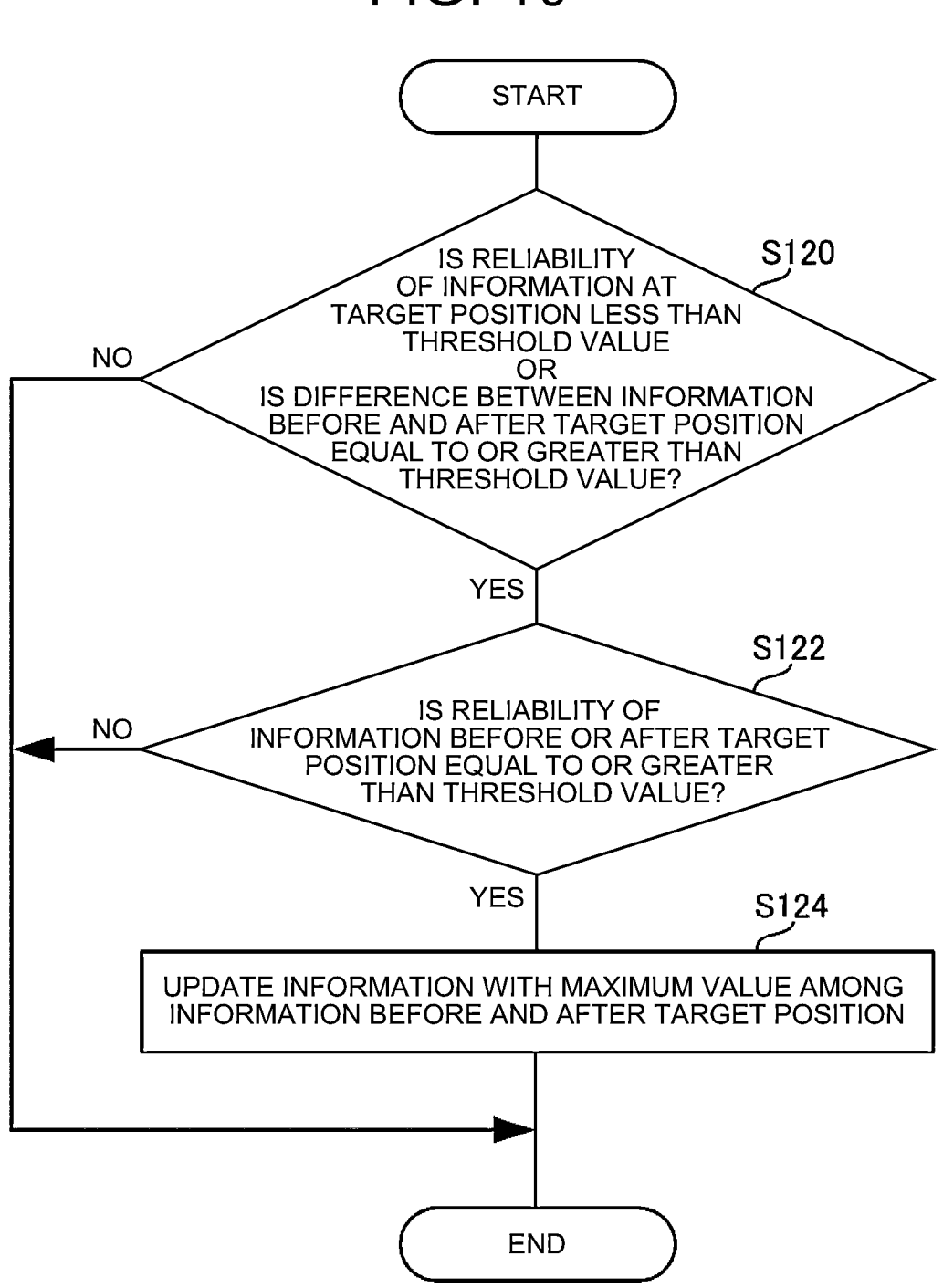
FIG. 10 is a flowchart showing a flow of a process of a preprocessing unit executed in the center server according to the present embodiment.

The above step S114 is realized by the processing routine shown in FIG. 10. The processing routine shown in FIG. 10 is executed for each type of the information of the regulation display at each target position among the plurality of types of the information of the regulation display acquired in step S112.

In step S120, the preprocessing unit 270 determines whether the reliability of the information of the regulation display at the target position is less than a threshold value (for example, 50%) or the difference between the information of the regulation display before and after the target position is equal to or greater than a threshold value (for example, 40 km/h). When the reliability of the information of the regulation display at the target position is less than the threshold value (for example, 50%) or when the difference between the information of the regulation display before and after the target position is equal to or greater than the threshold value, the process proceeds to step S122. On the other hand, when the reliability of the information of the regulation display at the target position is equal to or greater than the threshold value (for example, 50%) and the difference between the information of the regulation display before and after the target position is less than the threshold value (for example, 40 km/h), the processing routine ends without changing the information of the regulation display at the target position.

In step S122, the preprocessing unit 270 determines whether the reliability of the information of the regulation display before or after the target position is equal to or greater than a threshold value (for example, 50%).

In step S122, the preprocessing unit 270 proceeds to step S124 when the reliability of the information of the regulation display before or after the target position is equal to or greater than the threshold value. On the other hand, when the reliability of the information of the regulation display both before and after the target position is less than the threshold value, the processing routine ends without updating the information of the regulation display at the target position.

In step S124, the preprocessing unit 270 updates the information of the regulation display at the target position with the maximum value among the information of the regulation display before and after the target position, and ends the processing routine.

FIG. 11 shows an example of a plurality of types of the information of the regulation display acquired in step S112 when the information of the regulation display is a speed limit sign. In this example, the reliability of the information of the regulation display at position No. "4" is 30% and is less than the threshold value. Therefore, the speed limit of position No. "4" is updated with the speed limit of position No. "5", which is the maximum value among the information of the regulation display that has succeeded in conversion into information before and after position No. "4".

FIG. 12 shows an example of a plurality of types of the information of the regulation display acquired in step S112 when the information of the regulation display is a no-parking sign. In this example, the reliability of the information of the regulation display at position No. "4" is 30% and is less than the threshold value. Therefore, the flag related to the no-parking sign at position No. "4" is updated with the flag "1" related to the no-parking sign, which is the maximum value among the information of the regulation display that has succeeded in conversion into information before and after the position No. "4".

Then, in step S116 of FIG. 9, the diagnosis unit 280 diagnoses a violation when travel of the vehicle based on the travel information included in the vehicle information acquired from the on-board unit 20 of the vehicle 12 satisfies a violation condition based on the updated regulation value, and ends the driving diagnosis process.

Specifically, when the information of the regulation display is a speed limit sign, the diagnosis unit 280 diagnoses whether the driving of the vehicle 12 is considered a violation on the violation condition that the vehicle 12 is traveling significantly exceeding the speed limit in the vicinity of the sign related to the speed limit.

When the information of the regulation display is a stop sign, the diagnosis unit 280 diagnoses whether the driving of the vehicle 12 is considered a violation on a violation condition that the vehicle 12 does not stop in the vicinity of the stop sign.

When the information of the regulation display is a no-parking sign, the diagnosis unit 280 diagnoses whether the driving of the vehicle 12 is considered a violation on the violation condition that the vehicle 12 is parked in the vicinity of the no-parking sign.

When the information of the regulation display is a no-turning sign, the diagnosis unit 280 diagnoses whether the driving of the vehicle 12 is considered a violation on the violation condition that the vehicle 12 makes a turn in the vicinity of the no-turning sign.

Summary of Embodiment

When the conversion into information of the regulation display fails or when there is a missing part containing an abnormal value in the information, the center server 30 of the present embodiment updates the data of the missing part with information that has been successfully converted into information before or after the missing part. In this way, by supplementing the missing data with information that has been successfully converted into information, it is possible to suppress erroneous driving diagnosis.

Remarks

In the above embodiment, the data of the missing part is set to the maximum value among the information successfully converted into information before or after the missing part, but the present disclosure is not limited thereto. When there is a missing part and the result of the driving diagnosis performed based on the information successfully converted into information before or after the missing part is good, the data of the missing part may be set to the information of the regulation display with the good result. For example, when the vehicle 12 is traveling at 55 km/h at a position where the speed limit is 60 km/h, the result of the driving diagnosis is good. Here, when the speed limit of the missing part before or after the position where the speed limit is 60 km/h is 40 km/h, the speed limit of the missing part may be updated with 60 km/h at the position with the good diagnosis result.

It should be noted that various processors other than the CPU may execute the various processes that are executed when the CPU 20A and the CPU 30A read the software (program) in the above embodiment. In this case, a programmable logic device (PLD) in which a circuit configuration can be changed after manufacturing, such as a field-programmable gate array (FPGA), and a dedicated electric circuit or the like that is a processor having a circuit configuration specially designed to execute a specific process, such as an application specific integrated circuit (ASIC), are exemplified as a processor in this case. Further, each process described above may be executed by one of these various processors, or by a combination of two or more processors of the same type or different types (for example, a combination of FPGAs, a combination of a CPU and an FPGA, and the like). Further, the hardware structure of each of the various processors is, more specifically, an electric circuit in which circuit elements such as semiconductor elements are combined.

In the above embodiment, a mode in which each program is stored (installed) in advance in a non-transitory computer-readable recording medium has been described. For example, the control program 100 in the on-board unit 20 is stored in advance in the ROM 20B, and the processing program 150 in the center server 30 is stored in advance in the storage 30D. However, the present disclosure is not limited to this, and each program may be provided in a format recorded in a non-transitory recording medium such as a compact disc read-only memory (CD-ROM), a digital versatile disc read-only memory (DVD-ROM), and a universal serial bus (USB) memory. Further, the program may be downloaded from an external device via a network.

The flow of processes described in the above embodiment is an example, and unnecessary steps may be deleted, new steps may be added, or the process order may be changed within a range that does not deviate from the gist.

What is claimed is:

1. An information processing device comprising:
a non-transitory computer readable medium configured to store instructions thereon; and
a processor configured to communicate with the non-transitory computer readable medium, wherein the processor is configured to execute the instructions for:
acquiring travel information related to travel of a vehicle and information of an object indicating regulation display that has been converted into information from a captured image of the object indicating regulation display, the image being captured by a camera mounted on the vehicle;
identifying a missing part of the travel information based on whether conversion of the information of the object indicating regulation display fails or a reliability of a conversion of the travel information is below a threshold value;
setting the missing part to the travel information that has been successfully converted into conversion information, wherein the conversion information is information from the captured image that is successfully converted before or after detection of the missing part a reliability of the conversion information is greater than or equal to the threshold value;
setting the missing part to the conversion data comprises, when the missing part is detected, setting the missing part to the conversion information of the object indicating regulation display acquired at a preceding or succeeding position relative to a position where the travel information corresponding to the missing part was acquired; and
executing a driving diagnosis of the vehicle with respect to the regulation display based on the conversion information and the travel information.

2. The information processing device according to claim 1, wherein when there is the missing part and a result of the driving diagnosis performed based on the information that has been successfully converted into information before or after the missing part is good, the processor is c configured to set the data of the missing part to the information of the regulation display with the good result.

3. The information processing device according to claim 1, wherein when there is the missing part, the processor is configured to set the data of the missing part to a maximum value of the information that has been successfully converted into information before or after the missing part.

4. A driving diagnosis method in which a computer executes processes comprising:
acquiring travel information related to travel of a vehicle and information of an object indicating regulation display that has been converted into information from a captured image of the object indicating regulation display, the image being captured by a camera mounted on the vehicle;
identifying a missing part of the travel information based on whether conversion of the information of the object indicating regulation display fails or a reliability of a conversion of the travel information is below a threshold value;

setting the missing part to the travel information that has been successfully converted into conversion information, wherein the conversion information is information from the captured image that is successfully converted before or after the missing part or a reliability of the conversion information is greater than or equal to the threshold value;

setting the missing part to the conversion information comprises, when the missing part is detected, setting the missing part to the conversion information of the object indicating regulation display acquired at a preceding or succeeding position relative to a position where the travel information corresponding to the missing part was acquired; and executing a driving diagnosis of the vehicle with respect to the objecting indicating regulation display based on the conversion information and the travel information.

5. A non-transitory computer readable medium storing instructions that causes a computer to execute processes comprising:

acquiring travel information related to travel of a vehicle and information of an object indicating regulation display that has been converted into information from a captured image of the object indicating regulation display, the image being captured by a camera mounted on the vehicle;

identifying a missing part of the travel information based on whether conversion of the information of the object indicating regulation display fails or a reliability of a conversion of the travel information is below a threshold value;

setting the missing part to the travel information that has been successfully converted into conversion information, wherein the conversion information is information from the captured image that is successfully converted before or after the missing part or a reliability of the conversion information is greater than or equal to the threshold value;

setting the missing part to the conversion information comprises, when the missing part is detected, setting the missing part to the conversion information of the object indicating regulation display acquired at a preceding or succeeding position relative to a position where the travel information corresponding to the missing part was acquired; and executing a driving diagnosis of the vehicle with respect to the objecting indicating regulation display based on the conversion information and the travel information.

* * * * *